United States Patent [19]
Gueraud et al.

[11] Patent Number: 5,726,517
[45] Date of Patent: Mar. 10, 1998

[54] MAGNETOELECTRIC CLAW ROTOR, AND A METHOD OF MANUFACTURING SUCH A ROTOR

[75] Inventors: Alain Gueraud, Seichamps; Jean-Charles Mercier, Ludres, both of France

[73] Assignee: GEC Alsthom Moteurs SA, Nancy, France

[21] Appl. No.: 819,818

[22] Filed: Mar. 18, 1997

[30] Foreign Application Priority Data

Mar. 22, 1996 [FR] France ............... 96 03605

[51] Int. Cl.⁶ .................................................. H02K 1/24
[52] U.S. Cl. ................ 310/261; 310/262; 310/263; 310/156; 310/42; 29/598
[58] Field of Search ............................ 310/156, 261, 310/262, 263; 29/598

[56] References Cited

U.S. PATENT DOCUMENTS

| | | | |
|---|---|---|---|
| 3,321,652 | 5/1967 | Opel | 310/168 |
| 3,571,639 | 3/1971 | Tiltins | 310/168 |
| 4,024,628 | 5/1977 | Crites | 310/262 |
| 4,543,506 | 9/1985 | Kawada et al. | 310/156 |
| 4,549,341 | 10/1985 | Kasabian | 29/598 |
| 4,656,379 | 4/1987 | McCarty | 310/181 |
| 4,874,972 | 10/1989 | Bansal et al. | 310/57 |
| 5,220,223 | 6/1993 | Mehnert | 310/14 |
| 5,325,009 | 6/1994 | Capion et al. | 310/261 |

FOREIGN PATENT DOCUMENTS

| | | | |
|---|---|---|---|
| 728395 | 7/1932 | France | 310/263 |
| 61-35178 | 2/1986 | Japan | 310/261 |
| 5111201 | 4/1993 | Japan | H02K 7/14 |
| 752626 | 7/1980 | U.S.S.R. | 310/263 |

Primary Examiner—Thomas M. Dougherty
Assistant Examiner—B. Mullins
Attorney, Agent, or Firm—Sughrue, Mion, Zinn, Macpeak & Seas, PLLC

[57] ABSTRACT

The invention relates to a magnetoelectric claw rotor of the type comprising parts made of magnetic material forming the poles of the rotor, and parts made of non-magnetic material for separating poles of opposite polarity, all confined in a common hollow cylindrical case of non-magnetic material. The rotor comprises two single-pole end parts of magnetic material and of opposite polarity, at least one intermediate part of magnetic material, and parts of non-magnetic material, each single-pole end part has a chamfered pole, and two plane lateral faces disposed symmetrically about the plane of symmetry of the chamfered pole, the, or each, intermediate part has two poles of opposite polarity, having the same shape as the pole of the end parts, with each pole being separated from the facing pole by a non-magnetic part of shape complementary to the two poles, the cylindrical case having as many through windows as there are poles, each window being occupied by a distal tube element of magnetic material having the same polarity as the pole with which it is associated.

12 Claims, 7 Drawing Sheets

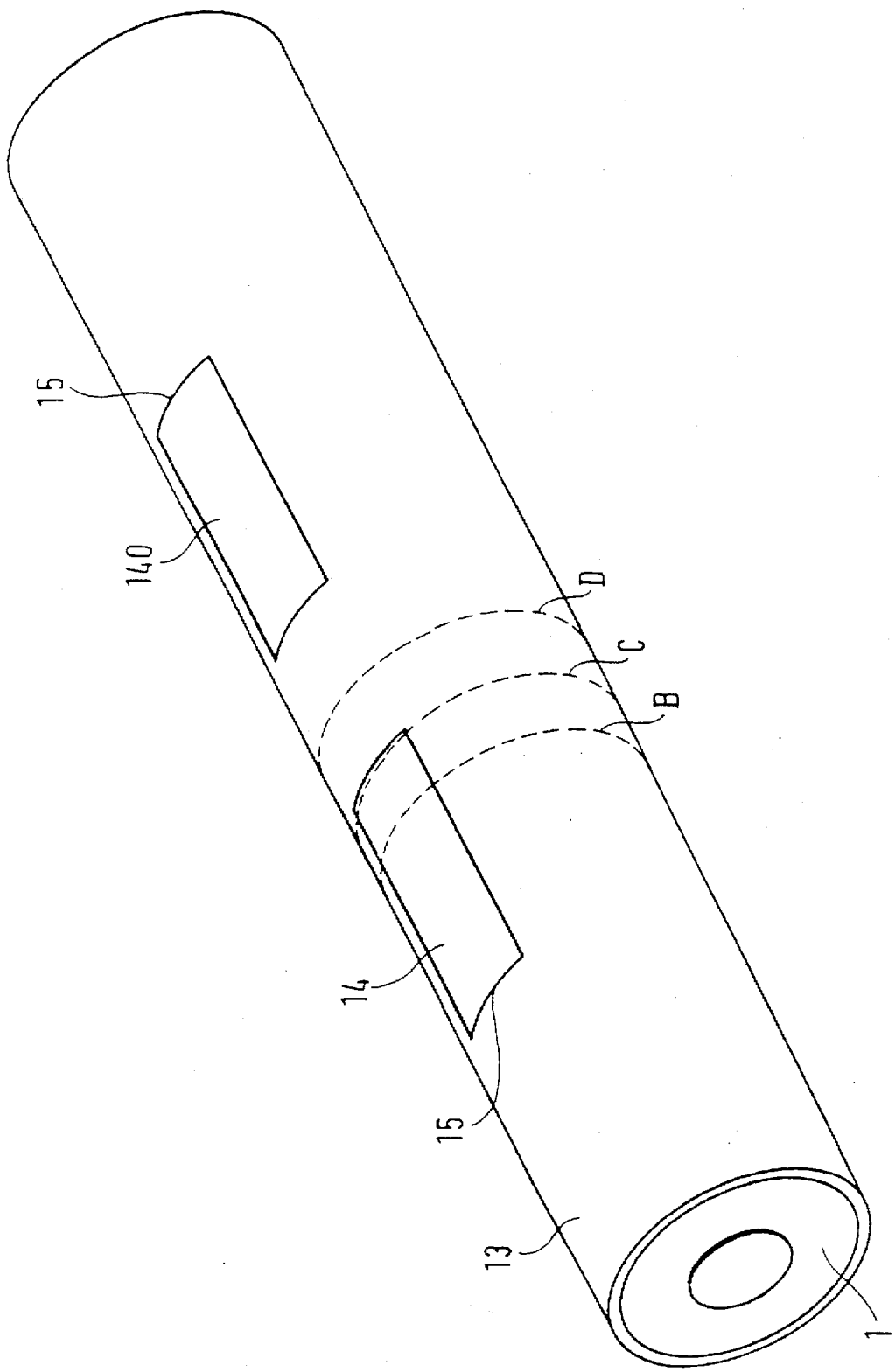

MAGNETOELECTRIC CLAW ROTOR, AND A METHOD OF MANUFACTURING SUCH A ROTOR

The invention relates to a magnetoelectric claw rotor, and to a method of manufacturing such a rotor. More particularly, the invention relates to a magnetoelectric rotor for use in a high speed synchronous machine, and to a method of manufacturing such a magnetoelectric claw rotor.

BACKGROUND OF THE INVENTION

Claw rotors are constituted by a plurality of magnetic and non-magnetic elements that are assembled together. The speeds that can be involved in certain high-speed synchronous machines may be equal to or greater than 50,000 revolutions per minute (rpm). As mentioned above, the rotors are assemblies of parts, and as a result claw-rotor manufacturers seek to obtain rotors having the highest possible centrifugal bursting strength, while still retaining an optimum aerodynamic profile.

To make solid rotors capable of operating at the above-mentioned speeds, it is necessary to use assembly techniques of the isostatic compression type or the equivalent in order to ensure that the rotor can withstand bursting. In rotation, the centrifugal force developed is proportional to the moving mass.

Known methods of manufacturing a magnetoelectric claw rotor of the type comprising magnetic portions forming the polarized "claws" of the rotor and non-magnetic portions for separating claws of opposite polarities, all confined in a non-magnetic hollow cylindrical case, include a step of filling the non-magnetic hollow cylinder with the magnetic and non-magnetic portions, and a step of isostatically compressing the assembly of magnetic portions, non-magnetic portions, and the hollow cylindrical case.

The use of an isostatic compression step requires the component parts of the rotor to be accurately assembled together. If any empty gaps remain during isostatic compression, then, on being compressed, the gaps give rise to displacements of the component parts that are harmful to the magnetic dimensioning and to the static and dynamic mechanical balance of the resulting rotor.

The least severe resulting problem would be a rotor having magnetic characteristics that fall short of the expected optimum characteristics, and the worst of such problems would be a rotor that is so unbalanced as to be unusable.

It is also necessary for the claws to be of special shapes for better machine efficiency.

For example, the longitudinal faces of magnetic claws facing the stator must advantageously present smoothly varying magnetic air gaps for optimizing the passage of magnetic flux between the claws and the stator of the rotary machine.

In another example, it is necessary to place non-magnetic material between two adjacent magnetic masses of opposite polarities (adjacent claws). The non-magnetic material serves to limit magnetic flux leakage passing between two adjacent claws of opposite polarities directly instead of passing via the stator.

The resulting magnetic or non-magnetic parts are of complex shape, and shaping them is lengthy and expensive, particularly to obtain the tolerances required by the isostatic compression treatment.

OBJECTS AND SUMMARY OF THE INVENTION

One of the objects of the present invention is to propose a solid magnetoelectric rotor having component elements that satisfy the magnetoelectric and mechanical criteria necessary for the intended speeds of rotation, while also making manufacture by isostatic compression possible.

Another object of the present invention is to propose a method of manufacturing such a rotor in which the machining of the component parts of the rotor is simplified.

To this end, the invention relates firstly to a magnetoelectric claw rotor of the type comprising magnetic material parts forming the poles of the rotor, and non-magnetic material parts for separating poles of opposite polarity, all confined in a hollow cylindrical casing of non-magnetic material. According to the invention, the rotor comprises two single-pole end parts of magnetic material and of opposite polarity, and a part of non-magnetic material, each single-pole part having a circularly cylindrical hub of radius substantially equal to the inside radius of the cylindrical case, and having a free end and a chamfered pole, said chamfered pole having a longitudinal face of the same radius as the hub, a sloping transverse face forming the chamfer relative to said longitudinal face, and two plane lateral faces disposed symmetrically about the plane of symmetry of the chamfered pole, and converging towards each other going from the longitudinal face towards the sloping face, transverse shoulders being formed between the hub and said plane lateral faces, the two parts of magnetic material being disposed on the same axis, with their sloping faces facing each other, the non-magnetic part being disposed between the facing sloping faces, and being complementary in shape to the two magnetic material parts such that the set of magnetic material parts and the non-magnetic material part constitutes a solid circular cylinder of radius substantially equal to the inside radius of the non-magnetic cylindrical case, the cylindrical case having two through windows each facing a respective one of the longitudinal faces of the magnetic material parts, each window being occupied by a distal tube element of magnetic material having the same polarity as the magnetic material part with which it is associated.

The invention also relates to another magnetoelectric claw rotor of the type comprising magnetic material parts forming the poles of the rotor, and non-magnetic material parts for separating poles of opposite polarity, all confined in a hollow cylindrical casing of non-magnetic material. According to the invention, the rotor comprises two single-pole end parts of magnetic material and of opposite polarity, at least one intermediate part of magnetic material, and parts of non-magnetic material, each single-pole part having a circularly cylindrical hub of radius substantially equal to the inside radius of the cylindrical case, and having a free end and a chamfered pole, said chamfered pole having a longitudinal face of the same radius as the hub, a sloping transverse face forming the chamfer relative to said longitudinal face, and two plane lateral faces disposed symmetrically about the plane of symmetry of the chamfered pole, and converging towards each other going from the longitudinal face towards the sloping face, transverse shoulders being formed between the hub and said plane lateral faces, the, or each, intermediate part comprising two poles of opposite polarity, of the same shape as the poles of the end parts, each having a sloping face facing the sloping face of the pole of one of the magnetic end parts or the sloping face of one of the poles of another intermediate part, each pole being separated from the facing pole by a non-magnetic part of shape complementary to the two poles such that the set of end parts, of intermediate part(s), and of parts of non-magnetic material constitutes a solid circular cylinder of radius substantially equal to the inside radius of the non-magnetic cylindrical case, the cylindrical case having as many through windows as there are poles, each window facing the longitudinal face of a corresponding one of the magnetic material poles, each window being occupied by a distal tube element of magnetic material having the same polarity as the pole with which it is associated.

Advantageously, in cross-section each through window is of generally converging shape going from the inside towards the outside of the cylindrical case, said distal tube elements being of a radius and a radial thickness substantially equal to the radius and the radial thickness of the cylindrical case, and having lateral edges that are complementary in shape to the converging shape of the windows.

The transverse shoulders of rotors of the invention are at an angle relative to the plane perpendicular to the axis of the rotor.

Each part of magnetic or of non-magnetic material is built up from a plurality of fitted coaxial cylindrical elements that are assembled to one another.

In an embodiment, each part of magnetic material or of non-magnetic material comprises a central solid cylindrical element tangential to the symmetrical plane lateral faces, and a hollow tubular element of inside radius substantially equal to the radius of the solid cylindrical element and of outside radius substantially equal to the inside radius of the cylindrical case.

Finally, the invention also relates to a method of manufacturing magnetoelectric claw rotors as described above. In the method, the cylindrical case is filled with the fitted and coaxial cylindrical elements, and the assembly of cylindrical elements and of the hollow cylindrical case is compressed isostatically.

Said distal tube elements are the first elements to be positioned in said cylindrical casing during the step of filling said casing.

Advantageously, the method may include a finishing step consisting in removing material axially from the rotor or in giving the outside face of a rotor a particular shape.

One of the advantages of the present invention results from the shape of the component parts of the rotor enabling an isostatic compression step to be performed while reducing risks concerning the quality of the result.

Another advantage of the present invention is that by manufacturing a plurality of easily-machinable tube elements and uniting said tube elements to produce a composite part, it is possible to avoid making component parts that are of complex shape.

Another advantage of the present invention results from the way in which nested tubes ensure better resistance to the rotor bursting centrifugally.

BRIEF DESCRIPTION OF THE DRAWINGS

Other advantages and characteristics of the present invention appear from the following description given with reference to the accompanying drawings, in which:

FIG. 5A is a diagrammatic view of an assembled rotor of the invention;

MORE DETAILED DESCRIPTION

Figure 1A:
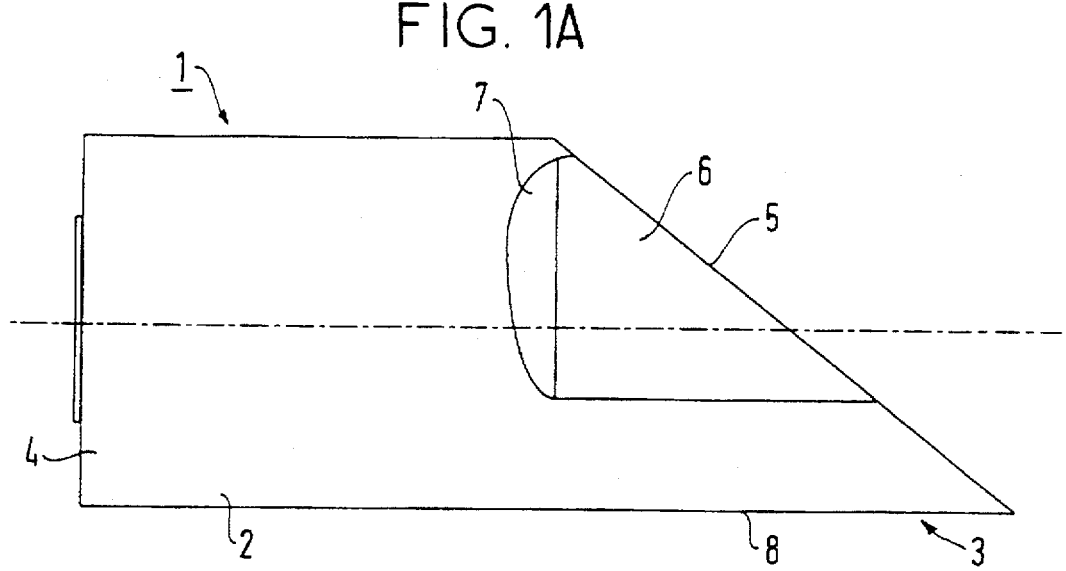
FIG. 1A is a diagrammatic view of a magnetic end part of a rotor of the invention.

In the following description, the terms "longitudinal" and "lateral" relate to surface elements that do not intersect the axis of the part or rotor under consideration.

The invention relates to a magnetoelectric claw rotor of the type comprising parts 1 and 9 of magnetic material forming the poles 3 of the rotor, and parts 12 of non-magnetic material for separating poles 3 of opposite polarity, all confined within a hollow right circular cylindrical casing 13 of non-magnetic material, the rotor being manufactured by the method described above.

In a first embodiment, the rotor is a two-pole rotor having two single-pole end parts 1 of magnetic material and of opposite polarity, together with a part 12 of non-magnetic material.

Each single-pole part 1 (FIGS. 1A, 1B, 1C) has a circularly cylindrical hub 2 of radius substantially equal to the inside radius of the cylindrical case 13, and having a free end 4 and a chamfered pole 3. The chamfered pole 3 has a longitudinal face 8 of the same radius as the hub 2, a sloping transverse face 5 forming the chamfer relative to the longitudinal face 8, and two plane lateral faces 6 disposed symmetrically about the plane of symmetry of the chamfered pole 3, and converging towards each other, going from the longitudinal face 8 towards the sloping face 5.

Transverse shoulders 7 are formed between the hub and the plane lateral faces 6.

Two parts 1 of magnetic material are placed on a common axis with their sloping faces 5 facing each other.

Figure 2A:
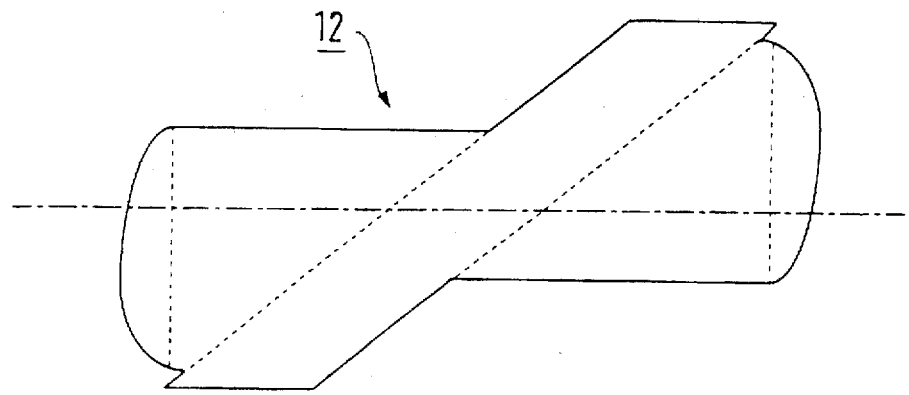
FIG. 2A is a diagrammatic view of an intermediate non-magnetic part of a rotor of the invention.
Figure 2B:
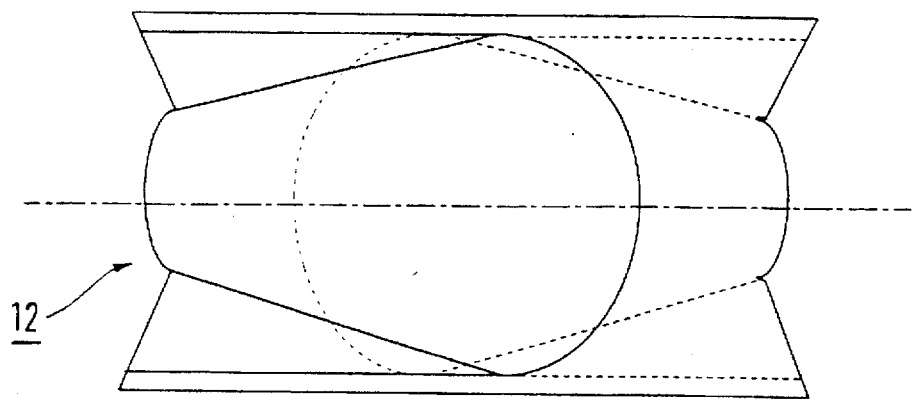
FIGS. 2B and 2C are diagrammatic views of the part shown in FIG. 2A, as seen from above and from the end, respectively.
Figure 2C:
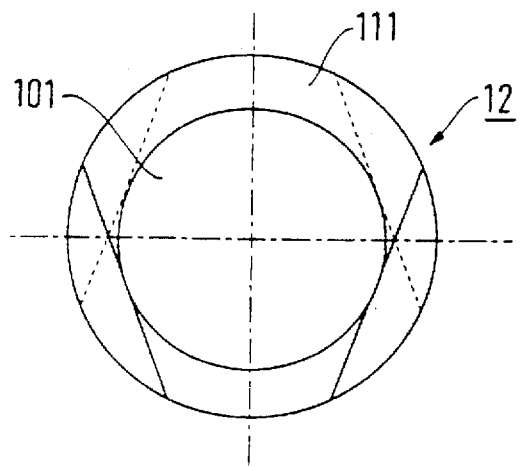

The non-magnetic part 12 (FIGS. 2A, 2B, 2C) is disposed between the facing faces 5, and it is of a shape that is complementary to the two parts 1 of magnetic material such that together the magnetic material parts 1 and the non-magnetic part 12 constitute a solid circular cylinder of radius substantially equal to the inside radius of the non-magnetic cylindrical case 13.

The cylindrical case 13 has two through windows 15 each facing the longitudinal face 8 of a corresponding one of the magnetic material parts 1, each window 15 being occupied by a distal tube element 14 of magnetic material having the same polarity as the associated part 1 of magnetic material.

In a second embodiment (shown in FIGS. 4 to 6), the rotor comprises an axial succession of two-pole rotors.

It has two single-pole end parts 1 of magnetic material, at least one intermediate part 9 of magnetic material, and parts 12 of non-magnetic material. The single-pole end parts 1 are always of opposite polarity.

Figure 1B:
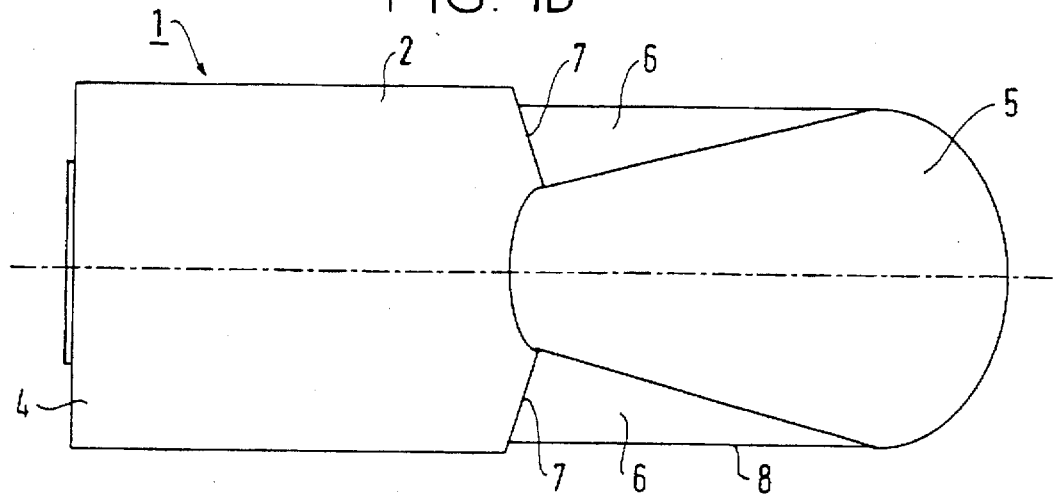
FIGS. 1B and 1C are diagrammatic views of the end part shown in FIG. 1A, as seen from above and from the end, respectively.
Figure 1C:
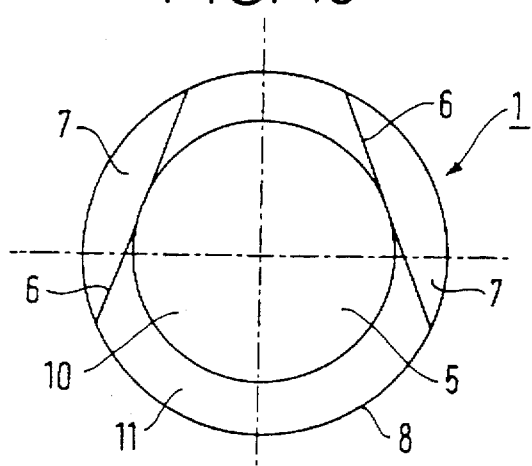

The end parts 1 have the same shape as that described for the first embodiment (FIGS. 1A, 1B, 1C).

Figure 3A:
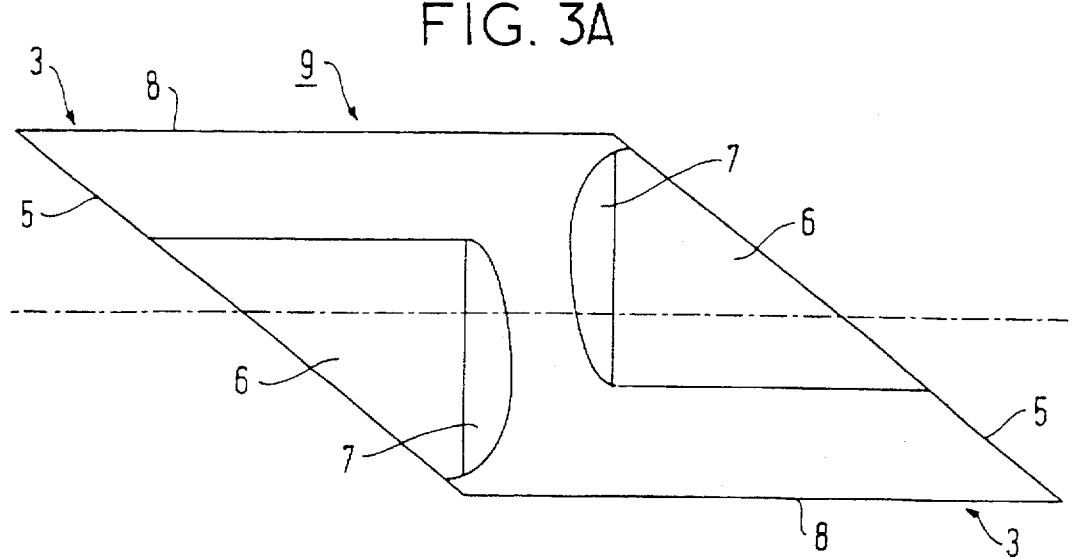
FIG. 3A is a diagrammatic view of a magnetic part of a rotor of the invention.
Figure 3B:
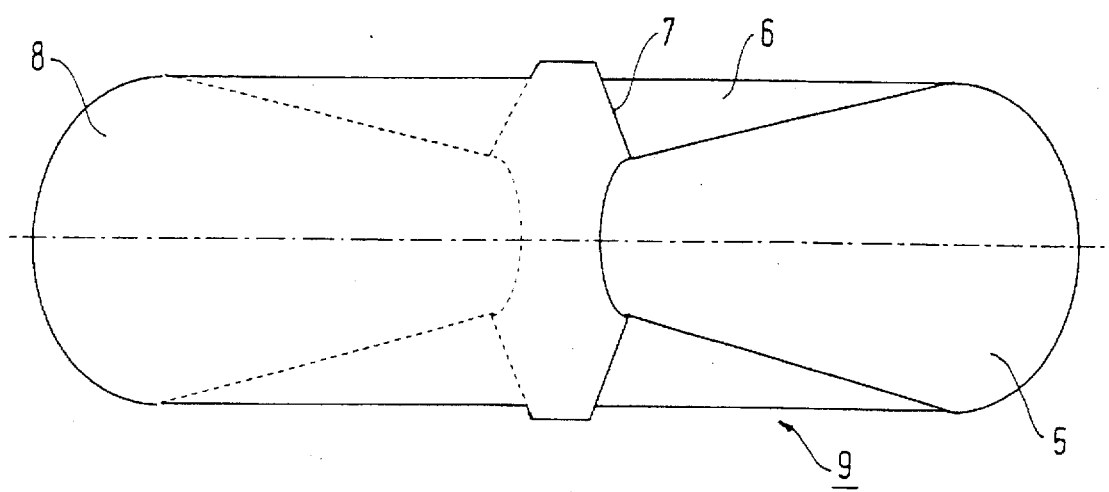
FIGS. 3B and 3C are diagrammatic views of the part shown in FIG. 3A, as seen from above and from the end, respectively.
Figure 3C:
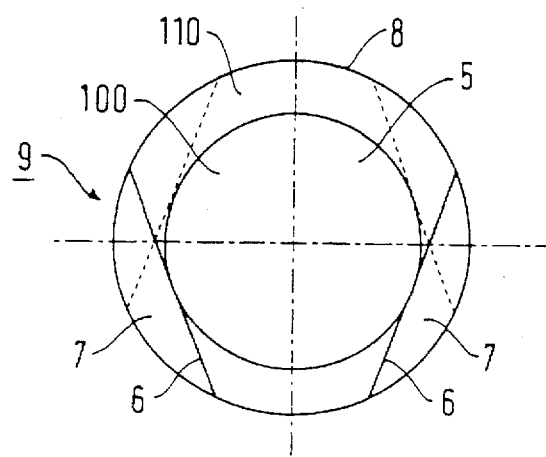

The (or each) intermediate part 9 (FIGS. 3A, 3B, 3C) comprises two poles 30 of opposite polarity, each having the same shape as the poles 3 of the end parts 1.

Each pole 30 of an intermediate part 9 has a sloping face 50 facing the sloping face 5 of the pole 3 of a magnetic end part 1 or the sloping face 50 of one of the poles 30 of another intermediate part 9.

Each pole 3, 30 is kept separate from the facing pole 30, 3 by a non-magnetic part 12 (FIGS. 2A, 2B, 2C) of complementary shape to the two poles 3, 30 such that the assembly comprising the end parts 1, the intermediate part(s) 9, and the parts 12 of non-magnetic material constitutes a solid circular cylinder of radius substantially equal to the inside radius of the non-magnetic cylindrical case 13.

As in the first embodiment, the cylindrical case 13 has as many through windows 15 as there are poles 3.

Figure 4:
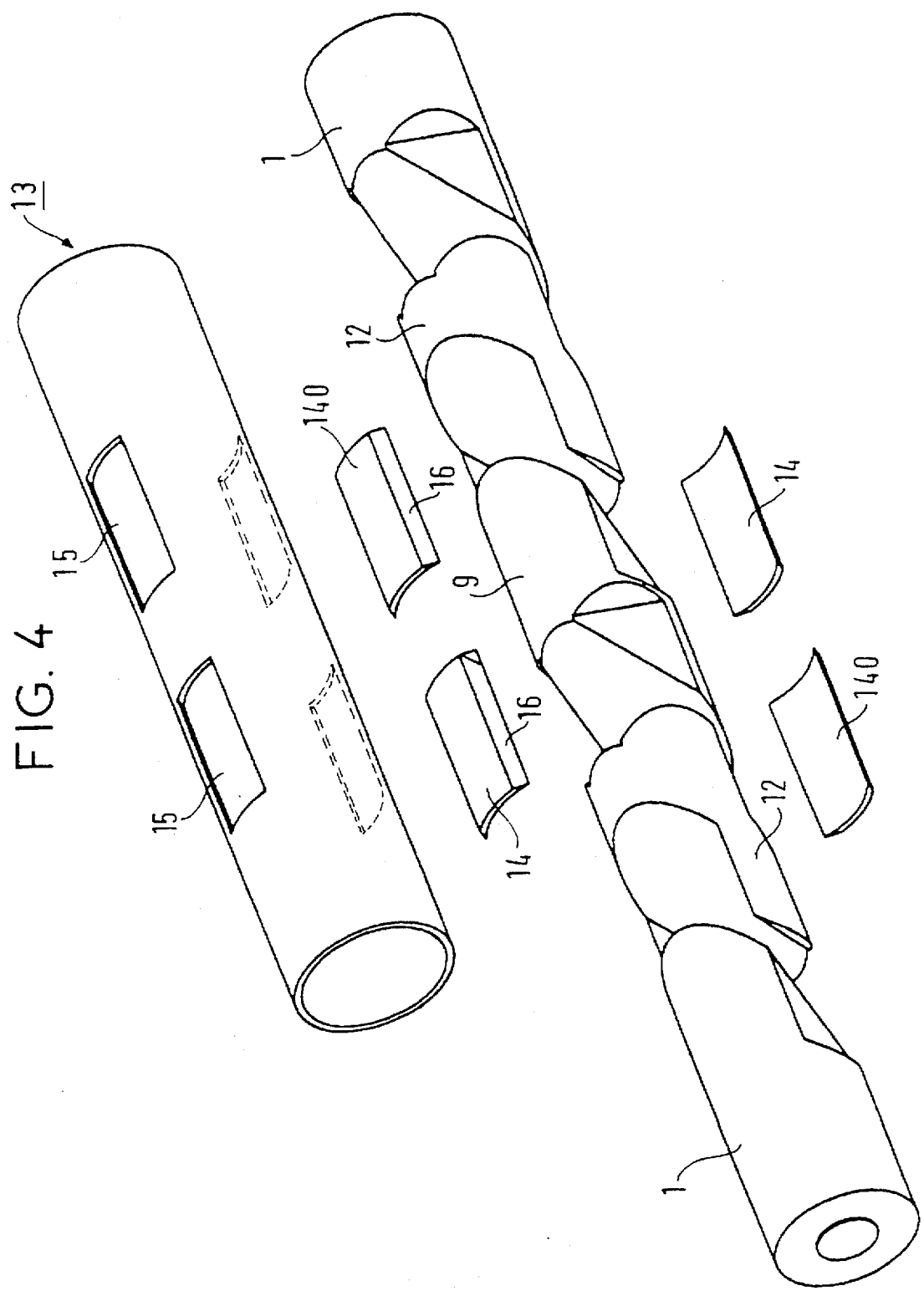
FIG. 4 is a diagrammatic exploded view of a rotor of the invention.

Each window 15 is in register with the longitudinal face 8 of a corresponding one of the poles 3 of magnetic material, and each window is occupied by a distal tube element 14, 140 of magnetic material having the same polarity as the associated pole 3 (FIG. 4).

In both embodiments, the through windows 15 have a cross-section of a shape that is generally converging from the inside towards the outside of the cylindrical case 13, and the distal tube elements 14, 140 are of a radius and of a radial thickness substantially equal to the radius and the radial thickness of the cylindrical case 13, with edges 16 that are complementary in shape to the converging shape of the windows 15.

Advantageously, the transverse shoulders 7 are at an angle with a plane perpendicular to the axis of the rotor. This angle is preferably 45°.

Figure 5B:
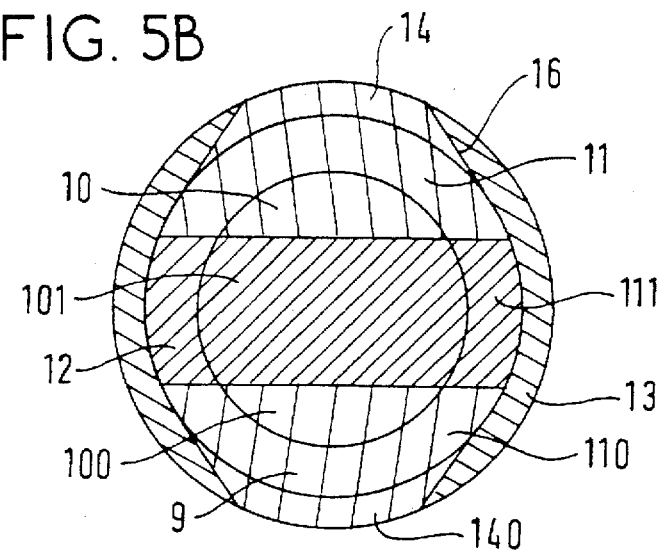
FIGS. 5B, 5C, and 5D are diagrammatic section views on respective section planes B, C, and D of FIG. 5A.
Figure 5C:
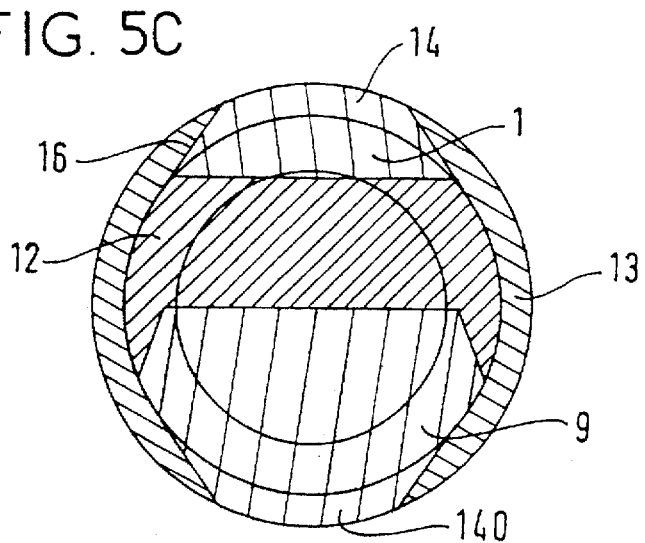
Figure 5D:
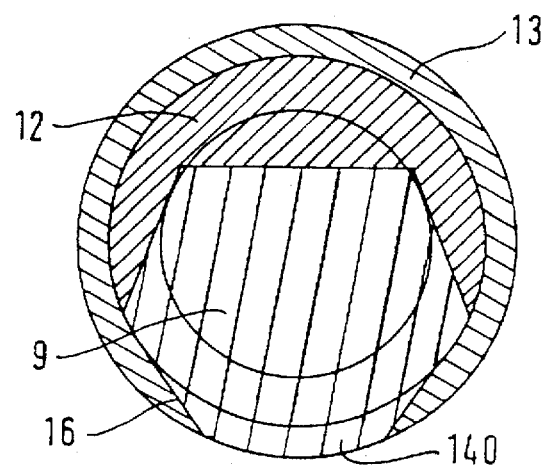

In the embodiment shown, the magnetic material parts 1, 9 and the non-magnetic part(s) 12 comprise a respective solid central cylinder 10, 100, 101 that is tangential to the symmetrical plane lateral faces 6, and a hollow tube element 11, 110, 111 of inside radius substantially equal to the radius of the solid cylindrical element 10 and of outside radius substantially equal to the inside radius of the cylindrical case 13. In addition, as mentioned before, the parts made of magnetic material have one distal tube element 14, 140 per pole 3, 30 of inside diameter and of outside diameter substantially equal to the inside and outside diameters of the cylindrical case 13. In FIGS. 5B, 5C, and 5D, each part is shaded in a respective manner independently of the cylindrical elements constituting it.

These distal tube elements 14, 140, because of the shape of their lateral edges 16, serve to provide a smoothly varying air gap for each pole 3, 30 of the rotor.

The invention also relates to a method of manufacturing the above-described magnetoelectric claw rotors.

One of the characteristic steps of the method of the invention consists in each part of magnetic material 12, 9 or each non-magnetic part 12 being made up of nested cylindrical or tubular elements 10, 11, 14; 100, 110, 40; 101, 111 that are independent, fitted to one another, and coaxial, each element 10, 11, 14, 100, 110, 140, 101, 111 having lateral edges, transverse ends, and a side face having an outside shape of radial thickness corresponding to the corresponding magnetic material part 1, 9 or non-magnetic part 12.

In an implementation of the method of the invention, the distal tube elements 14, 140 are the first of the elements 10, 11, 14, 100, 110, 140, 101, 111 to be positioned in said cylindrical case 13 while it is being filled.

Figure 6:
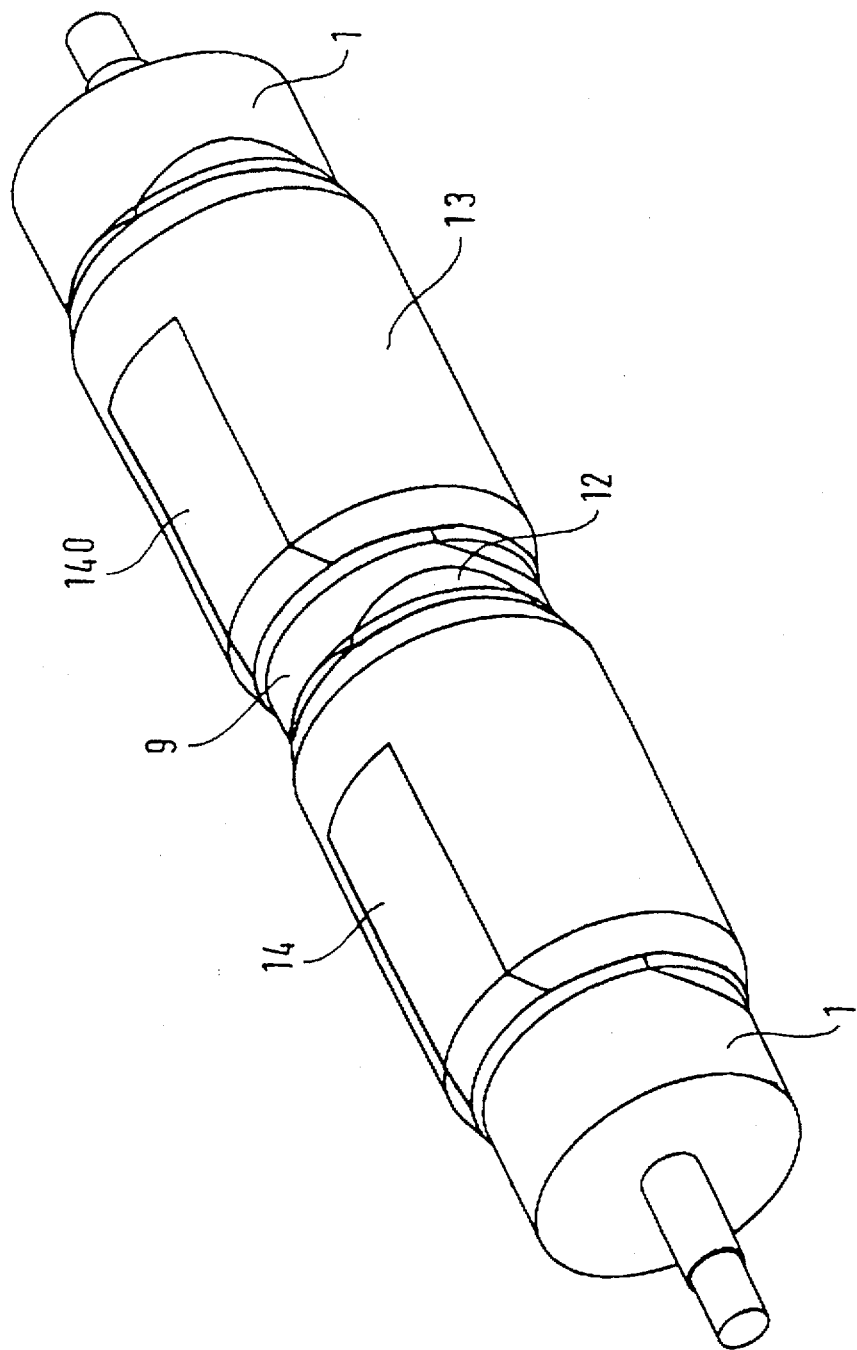
FIG. 6 is a diagrammatic view of a rotor of the invention after the final machining step.

In the method of the invention, after the isostatic compression step, the resulting rotor can be subjected to a finishing step. By way of example, the finishing step may consist in removing material axillary from the rotor to lighten it or in giving the outside face of the rotor a special shape (FIG. 6).

Naturally, the invention is not limited to the embodiments described and shown, and numerous variants may be made thereto by the person skilled in the art without going beyond the invention. In particular, without going beyond the ambit of the invention, the number of component elements in each part can be varied without going beyond the ambit of the present invention.

We claim:

1. A magnetoelectric claw rotor of the type comprising magnetic material parts forming the poles of the rotor, and non-magnetic material parts for separating poles of opposite polarity, all confined in a hollow cylindrical casing of non-magnetic material, the rotor comprising two single-pole end parts of magnetic material and of opposite polarity, and a part of non-magnetic material, each single-pole part having a circularly cylindrical hub of radius substantially equal to the inside radius of the cylindrical case, and having a free end and a chamfered pole, said chamfered pole having a longitudinal face of the same radius as the hub, a sloping transverse face forming the chamfer relative to said longitudinal face, and two plane lateral faces disposed symmetrically about the plane of symmetry of the chamfered pole, and converging towards each other going from the longitudinal face towards the sloping face, transverse shoulders being formed between the hub and said plane lateral faces, the two parts of magnetic material being disposed on the same axis, with their sloping faces facing each other, the non-magnetic part being disposed between the facing sloping faces, and being complementary in shape to the two magnetic material parts such that the set of magnetic material parts and the non-magnetic material part constitutes a solid circular cylinder of radius substantially equal to the inside radius of the non-magnetic cylindrical case, the cylindrical case having two through windows each facing a respective one of the longitudinal faces of the magnetic material parts, each window being occupied by a distal tube element of magnetic material having the same polarity as the magnetic material part with which it is associated.

2. A magnetoelectric claw rotor of the type comprising magnetic material parts forming the poles of the rotor, and non-magnetic material parts for separating poles of opposite polarity, all confined in a hollow cylindrical casing of non-magnetic material, the rotor comprising two single-pole end parts of magnetic material and of opposite polarity, at least one intermediate part of magnetic material, and parts of non-magnetic material, each single-pole part having a circularly cylindrical hub of radius substantially equal to the inside radius of the cylindrical case, and having a free end and a chamfered pole, said chamfered pole having a longitudinal face of the same radius as the hub, a sloping transverse face forming the chamfer relative to said longitudinal face, and two plane lateral faces disposed symmetrically about the plane of symmetry of the chamfered pole, and converging towards each other going from the longitudinal face towards the sloping face, transverse shoulders being formed between the hub and said plane lateral faces, the, or each, intermediate part comprising two poles of opposite polarity, of the same shape as the poles of the end parts, each having a sloping face facing the sloping face of the pole of one of the magnetic end parts or the sloping face of one of the poles of another intermediate part, each pole being separated from the facing pole by a non-magnetic part of shape complementary to the two poles such that the set of end parts, of intermediate part(s), and of parts of non-magnetic material constitutes a solid circular cylinder of radius substantially equal to the inside radius of the nonmagnetic cylindrical case, the cylindrical case having as many through windows as there are poles, each window facing the longitudinal face of a corresponding one of the magnetic material poles, each window being occupied by a distal tube element of magnetic material having the same polarity as the pole with which it is associated.

3. A magnetoelectric rotor according to claim 1, wherein, in cross-section each through window is of generally converging shape going from the inside towards the outside of the cylindrical case, said distal tube elements being of a radius and a radial thickness substantially equal to the radius and the radial thickness of the cylindrical case, and having lateral edges that are complementary in shape to the converging shape of the windows.

4. A magnetoelectric rotor according to claim 1, wherein the transverse shoulders are at an angle relative to the plane perpendicular to the axis of the rotor.

5. A magnetoelectric rotor according to claim 1, wherein each part of magnetic material is built up from a plurality of fitted coaxial cylindrical elements that are assembled to one another.

6. A magnetoelectric rotor according to claim 1, wherein each part of non-magnetic material is built up from a plurality of fitted coaxial cylindrical elements that are assembled to one another.

7. A magnetoelectric rotor according to claim 5, wherein each part of magnetic material comprises a central solid cylindrical element tangential to the symmetrical plane lateral faces, and a hollow tubular element of inside radius substantially equal to the radius of the solid cylindrical element and of outside radius substantially equal to the inside radius of the cylindrical case.

8. A magnetoelectric rotor according to claim 5, wherein each part of non-magnetic material comprises a central solid cylindrical element tangential to the symmetrical plane lateral faces, and a hollow tubular element of inside radius substantially equal to the radius of the solid cylindrical element and of outside radius substantially equal to the inside radius of the cylindrical case.

9. A method of manufacturing a magnetoelectric claw rotor according to claim 5, wherein the cylindrical case is filled with the fitted and coaxial cylindrical elements, and the assembly of cylindrical elements and of the hollow cylindrical case is compressed isostatically.

10. A method of manufacture according to claim 9, wherein said distal tube elements are the first elements to be positioned in said cylindrical casing during the step of filling said casing.

11. A method of manufacture according to claim 9, including a finishing step consisting in removing material axially from the rotor.

12. A method of manufacture according to claim 9, including giving the outside face of a rotor a particular shape.

* * * * *